United States Patent
Ellis et al.

(10) Patent No.: US 10,641,720 B2
(45) Date of Patent: May 5, 2020

(54) THERMAL BARRIER COATING SPALLATION DETECTION SYSTEM

(71) Applicant: General Electric Company, Schenectady, NY (US)

(72) Inventors: Andrew David Ellis, Greenville, SC (US); Kurt Kramer Schleif, Greenville, SC (US); Zachary John Snider, Greenville, SC (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 15/726,759

(22) Filed: Oct. 6, 2017

(65) Prior Publication Data
US 2019/0107499 A1    Apr. 11, 2019

(51) Int. Cl.
| | |
|---|---|
| *G01N 25/72* | (2006.01) |
| *G01N 21/84* | (2006.01) |
| *C23C 4/067* | (2016.01) |
| *C23C 4/073* | (2016.01) |
| *C23C 28/00* | (2006.01) |
| *F01D 5/28* | (2006.01) |

(52) U.S. Cl.
CPC ......... *G01N 25/72* (2013.01); *G01N 21/8422* (2013.01); *C23C 4/067* (2016.01); *C23C 4/073* (2016.01); *C23C 28/3455* (2013.01); *F01D 5/288* (2013.01)

(58) Field of Classification Search
CPC .... G01N 25/72; G01N 21/8422; F01D 5/288; C23C 28/3455; C23C 4/073; C23C 4/067
USPC ...................................... 250/459.1
See application file for complete search history.

(56) References Cited

U.S. PATENT DOCUMENTS

| | | |
|---|---|---|
| 6,072,568 A | 6/2000 | Paton et al. |
| 2003/0055594 A1 | 3/2003 | Bunker et al. |
| 2003/0115941 A1 | 6/2003 | Srivastava et al. |
| 2007/0134518 A1 | 6/2007 | Feist et al. |
| 2008/0317090 A1 | 12/2008 | Tralshawala et al. |
| 2009/0122832 A1* | 5/2009 | Feist .............. C23C 4/12 374/161 |
| 2009/0245321 A1 | 10/2009 | Ringermacher et al. |
| 2012/0050537 A1* | 3/2012 | Ringermacher ... G01B 11/0658 348/164 |
| 2014/0363294 A1 | 12/2014 | Lamberton et al. |
| 2015/0028208 A1 | 1/2015 | Xu |

(Continued)

FOREIGN PATENT DOCUMENTS

FR    2 979 015 A1    2/2013

OTHER PUBLICATIONS

Extended European Search Report and Opinion issued in connection with EP Application No. 18196927.0, dated Jan. 31, 2019 (7 pp.).

*Primary Examiner* — David P Porta
*Assistant Examiner* — Meenakshi S Sahu
(74) *Attorney, Agent, or Firm* — Eversheds Sutherland (US) LLP

(57) ABSTRACT

The present application thus provides a thermal barrier coating spallation detection system for a gas turbine. The thermal barrier coating spallation detection system may include a hot gas path component with a phosphor layer and a thermal barrier coating, a stimulant radiation source, and an optical device such that the optical device directs stimulant radiation at the thermal barrier coating and receives emission radiation. A change in the received emission radiation indicates spallation of the thermal barrier coating.

20 Claims, 3 Drawing Sheets

(56) References Cited

U.S. PATENT DOCUMENTS

| | | |
|---|---|---|
| 2015/0085895 A1 | 3/2015 | Howard et al. |
| 2017/0058682 A1 | 3/2017 | Ford et al. |
| 2017/0081753 A1 | 3/2017 | Zhang et al. |
| 2017/0122561 A1 | 5/2017 | Nagaraj |
| 2017/0145836 A1 | 5/2017 | Sivaramakrishnan et al. |
| 2017/0165708 A1 | 6/2017 | Sivaramakrishnan et al. |
| 2017/0241308 A1 | 8/2017 | Dondzila et al. |

\* cited by examiner

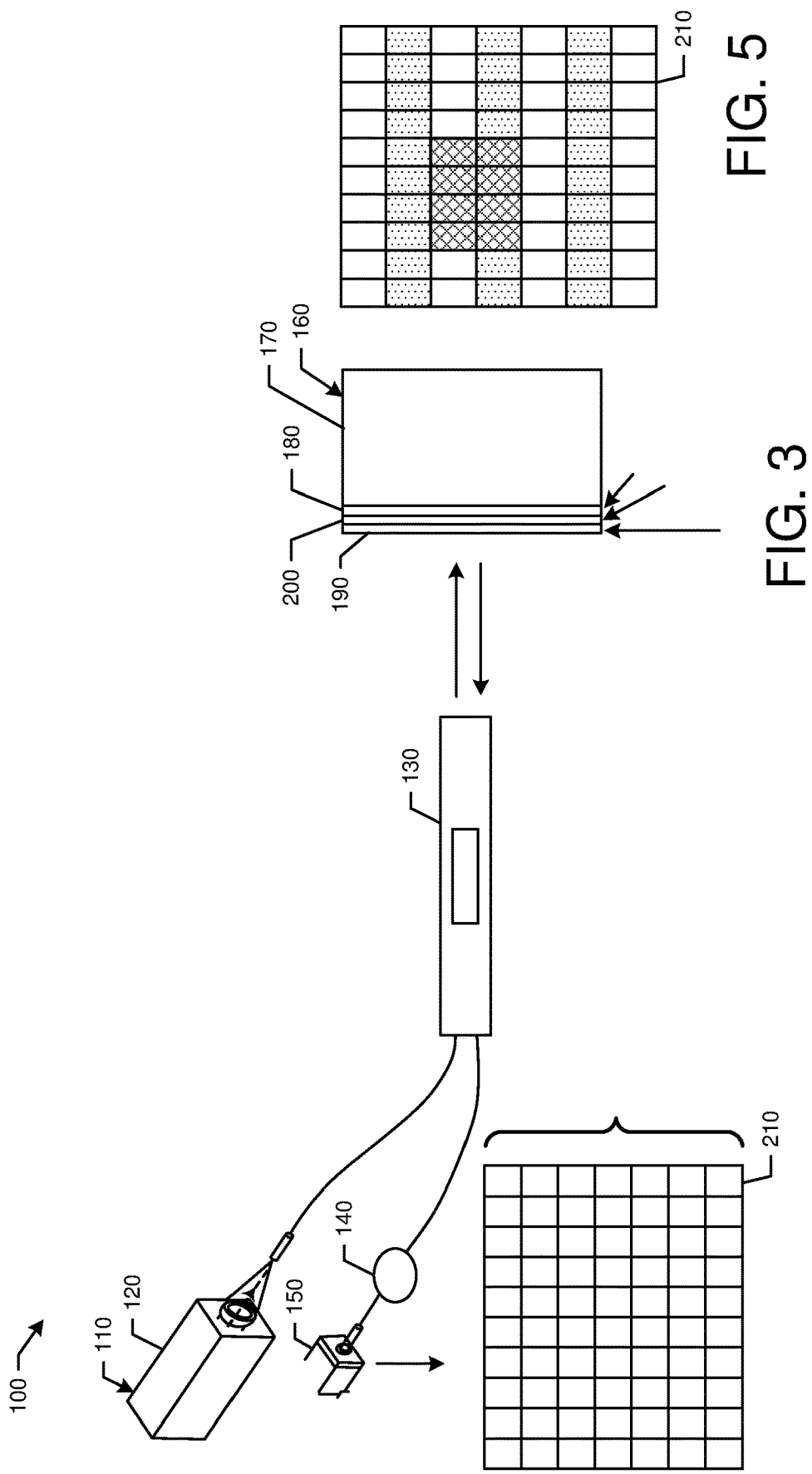

THERMAL BARRIER COATING SPALLATION DETECTION SYSTEM

TECHNICAL FIELD

The present application and the resultant patent relate generally to gas turbine engines and more particularly relate to a thermographic based thermal barrier coating spallation detection system that provides continuous, real time feedback on the integrity of the thermal barrier coatings on hot gas path components.

BACKGROUND OF THE INVENTION

Overall gas turbine operation and efficiency improves with higher operating temperatures. The lifetime of the components in the hot gas path, however, may be compromised given these higher temperatures and the hostile operating conditions. Ceramic coatings such as thermal barrier coatings may be used to protect the components from the hot temperatures, the chemical environment, and the physical conditions found within the hot gas path.

Over time, the thermal barrier coatings may be subject to spallation. When spallation occurs, the hot gas path components must be removed and replaced within a short amount of time or catastrophic failure may occur. As a result, the gas turbine engine must be shut down on a periodic basis to inspect for spallation and other types of damage. Such a shutdown may be expensive in term of lost production and in terms of the man hours required for the inspection.

SUMMARY OF THE INVENTION

The present application and the resultant patent thus provide a thermal barrier coating spallation detection system for a gas turbine. The thermal barrier coating spallation detection system may include a hot gas path component with a phosphor layer and a thermal barrier coating, a stimulant radiation source, and an optical device such that the optical device directs stimulant radiation at the thermal barrier coating and receives emission radiation. A change in the received emission radiation indicates spallation of the thermal barrier coating.

The present application and the resultant patent further provide a method of inspecting a thermal barrier coating of a hot gas path component for spallation. The method may include the steps of emitting stimulant radiation at the thermal barrier coating, receiving emission radiation from the thermal barrier coating, comparing successive received emission radiation, and indicating spallation of the thermal barrier coating if a change is shown in the successive received emission radiation.

The present application and the resultant patent further provide a thermal barrier coating spallation detection system for a gas turbine engine. The thermal barrier coating spallation detection system may include a hot gas path component with a phosphor layer and a thermal barrier coating, a stimulant radiation source, an optical device to direct stimulant radiation at the thermal barrier coating and receive emission radiation, and a digital camera in communication with the optical device. A change in the received emission radiation displayed on the digital camera indicates spallation of the thermal barrier coating.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a schematic diagram of a thermal barrier coating spallation detection system as may be described herein.

FIG. 4 is a schematic diagram of an output of the thermal barrier coating spallation detection system of FIG. 3 showing no spallation.

FIG. 5 is a schematic diagram of an output of the thermal barrier coating spallation detection system of FIG. 3 showing spallation.

DETAILED DESCRIPTION

Figure 1:
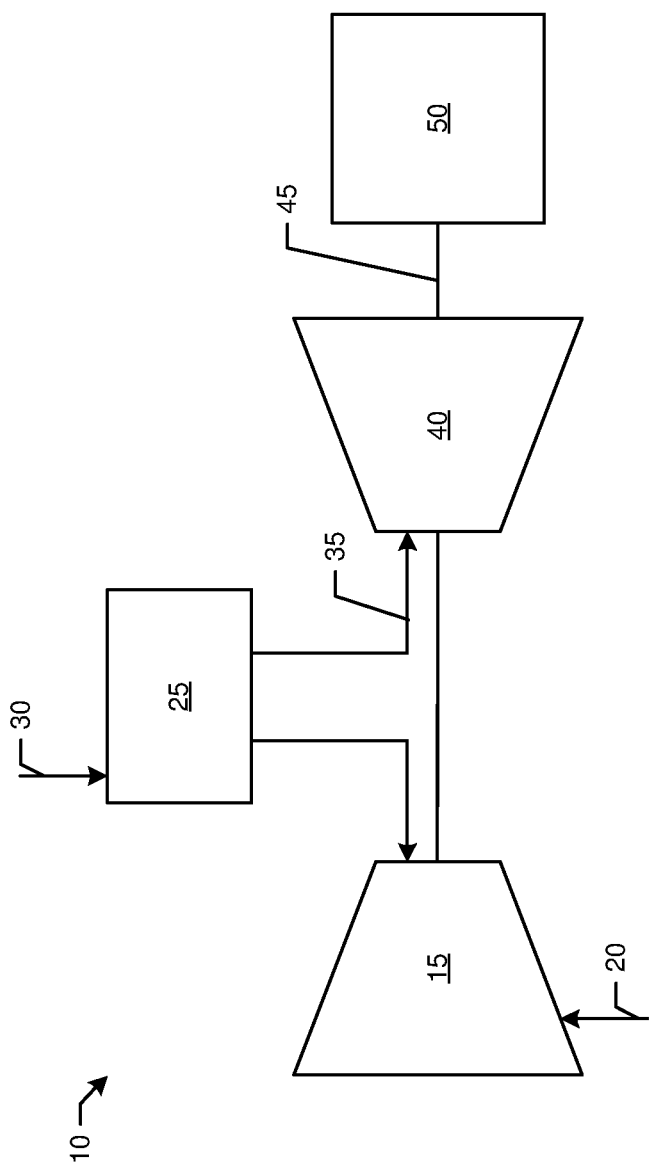
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of hot combustion gases 35. Although only a single combustor 25 is shown, the gas turbine engine 10 may include any number of combustors 25. The flow of hot combustion gases 35 is in turn delivered to a turbine 40. The flow of hot combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
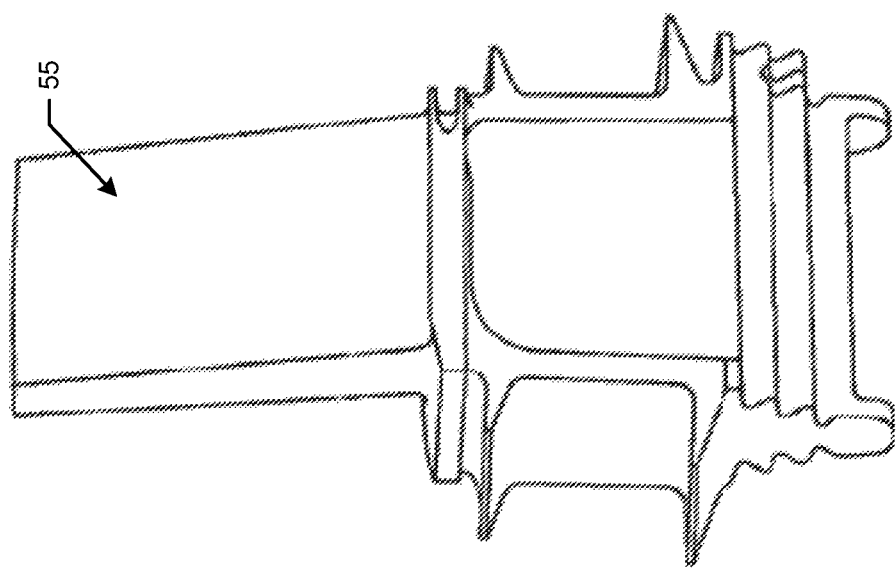
FIG. 2 is a perspective view of a hot gas path component in the form of a turbine blade.

FIG. 2 is a perspective view of an example of a hot gas path component 55 such as a bucket or nozzle. The hot gas path component 55 may receive a thermal barrier coating as will be described in more detail below. Other components such as shrouds, combustors, transition pieces, and the like may be used herein. Any component facing the hot combustion gases 35 may be used herein.

FIG. 3 is a schematic diagram of a thermal barrier coating spallation detection system 100 as may be described herein. The thermal barrier coating spallation detection system 100 may include a stimulant radiation source 110. In this example, the stimulant radiation source 110 may be a conventional laser 120 and the like. The stimulant radiation source 110 may produce radiation in the form of light within a predetermined wavelength range. Other types of stimulant radiation sources 110 may include ultraviolet sources, infrared sources, and other types of conventional light sources.

The thermal barrier coating spallation detection system 100 also may include one or more optic devices 130. The optic devices 130 may include conventional filters, resonators, sensors, and the like to emit the stimulant radiation and receive an emission radiation in response thereto. The thermal barrier coating spallation detection system 100 also may include one or more conventional optical filters 140 and a digital camera 150. A conventional photodetector also may be used. The optical filters 140 may focus and/or break down the colors of the received emission radiation such that the received emission radiation may be processed, displayed, and recorded by the digital camera. Different types of image processing software may be used herein. Other components and other configurations may be used herein.

The thermal barrier coating spallation detection system 100 may be used with one or more hot gas path components 160. As described above, the hot gas path component 160 may be a bucket, a nozzle, a shroud, a combustor, a transition piece, and the like. The hot gas path component 160 may include a substrate 170. The substrate 170 may be made out of an alloy of nickel, cobalt, iron, or combinations thereof. For example, the substrate 170 may include a high temperature, heat-resistant alloy, e.g., a superalloy. Non-limiting examples of suitable high temperature nickel-based alloys include Inconel®, Nimonic®, Rene® (e.g., Rene® 80, Rene® 95 alloys), Udimet®, or combinations thereof. Specifically, the substrate 130 may be made out of one or more of nickel-base superalloys, cobalt-base superalloys, ceramic matrix composites, and similar materials.

The hot gas path component 160 may include a base coat 180 on the substrate 160. The base coat 180 may be formed from a metallic oxidation-resistant material that protects the underlying substrate 170 and enables the thermal barrier coating described below to more tenaciously adhere to substrate. The base coat 180 thus provides functionality in the form of adhesion promotion and oxidation resistance. Suitable materials for the base coat 180 may include $M_1CrAlY$ alloy powders, where $M_1$ may represent a metal such as iron, nickel, platinum or cobalt. Other materials may include silicide compounds or elemental silicon, as well as metal aluminides such as nickel aluminide, platinum aluminide, or combinations thereof.

The hot gas path component 160 may include a thermal barrier coating 190. The thermal barrier coating 190 may be a material capable of substantially reducing heat flow to the underlying substrate 170 of the hot gas path component 160, that is, forming a thermal barrier. The thermal barrier coating 190 may have a melting point greater than about 1000° C. to about 3000° C. Examples of ceramic thermal barrier coating materials include and are not limited to various zirconias, in particular chemically stabilized zirconias (for example, metal oxides blended with zirconia), such as yttria-stabilized zirconias, ceria-stabilized zirconias, calcia-stabilized zirconias, scandia-stabilized zirconias, magnesia-stabilized zirconias, india-stabilized zirconias, ytterbia-stabilized zirconias, lanthana-stabilized zirconias, gadolinia-stabilized zirconias, as well as mixtures of such stabilized zirconias.

The hot gas path component 160 also may have a thermographic based phosphor layer 200 positioned between the base coat 180 and the thermal barrier coating 190. The thermographic based phosphor layer 200 may be made out of any type of luminescent material with a phosphorescent material and the like. Examples include materials such as yttrium aluminum garnet (YAG) crystal, lutetium aluminum garnet (LuAG) crystal, scandium aluminum garnet (ScAG) crystal, yttrium aluminum boron nitrogen garnet (YABNG) crystal, yttrium aluminum boron garnet (YABG) crystal, quartz crystal, sapphire crystal, or any other suitable crystal doped with a thermographic phosphor. By way of example, the crystal may be doped with rare earth elements such as neodymium (Nd), chromium (Cr), erbium (Er), ytterbium (Yb), cerium (Ce), dysprosium (Dy), thulium (Tm), or any other suitable thermographic phosphor and combinations thereof. Other components and other configurations may be used herein.

In use, the base coat 180, the thermographic based phosphor layer 200, and the thermal barrier coating 190 may be applied in a conventional manner to the substrate 170 of the hot gas path component 160. The hot gas path component 160 may be put into operation within the gas turbine engine 10 in a conventional manner. The thermal barrier coating spallation detection system 100 may continuously or periodically monitor the thermal barrier coating 190. Specifically, the thermal barrier coating spallation detection system 100 may direct stimulant radiation from the laser 120 or other type of stimulant radiation source 110 via the optical devices 130 and receive the emission radiation. The emission radiation may be processed and displayed via the optical filter 140 and the digital camera 150. As is shown in FIG. 4, the thermal barrier coating 190 may be shown to be intact if the emission radiation results in a uniform response across a pixel grid 210 in the digital camera 150. As is shown in FIG. 5, spallation may have occurred if there is a change shown in the pixel grid 210. In other words, the thermographic phosphor layer 200 may be visible due to spallation and caused to fluoresce so as to vary the nature of the emission radiation. The thermal barrier coating spallation detection system 100 thus may indicate that a shutdown is necessary for further inspection and possible repair.

The thermal barrier coating spallation detection system 100 thus continuous or periodically monitors the hot gas path components 160 or other components protected by a thermal barrier coating. As a result, periodic inspections for spallation may be eliminated. Rather, the customer may operate the gas turbine engine 10 continuously until the thermal barrier coating spallation detection system 100 indicates that spallation has occurred. The overall costs of periodic outages for the periodic inspections thus may be avoided while the customer may confidently operate the gas turbine engine.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A thermal barrier coating spallation detection system for a gas turbine engine, comprising:
   a hot gas path component installed within the gas turbine;
   the hot gas path component comprising a phosphor layer and a thermal barrier coating applied over the phosphor layer;
   a stimulant radiation source; and
   an optical device;
   wherein the optical device directs stimulant radiation at the thermal barrier coating and receives emission radiation; and
   wherein a change in the received emission radiation caused by fluorescence of the phosphor layer indicates spallation of the thermal barrier coating.

2. The thermal barrier coating spallation detection system of claim 1, wherein the stimulant radiation source comprises a laser.

3. The thermal barrier coating spallation detection system of claim 1, further comprising an optical filter in communication with the optical device.

4. The thermal barrier coating spallation detection system of claim 1, further comprising a digital camera in communication with the optical device.

5. The thermal barrier coating spallation detection system of claim 4, wherein the digital camera comprises a pixel grid.

6. The thermal barrier coating spallation detection system of claim 5, wherein a change in the pixel grid indicates spallation of the thermal barrier coating.

7. The thermal barrier coating spallation detection system of claim 1, wherein the phosphor layer comprises a thermographic based phosphor layer.

8. The thermal barrier coating spallation detection system of claim 7, wherein the thermographic based phosphor layer comprises a crystal.

9. The thermal barrier coating spallation detection system of claim 8, wherein the crystal comprises an yttrium aluminum garnet (YAG) crystal, a lutetium aluminum garnet (LuAG) crystal, a scandium aluminum garnet (ScAG) crystal, a yttrium aluminum boron nitrogen garnet (YABNG) crystal, an yttrium aluminum boron garnet (YABG) crystal, a quartz crystal, or a sapphire crystal.

10. The thermal barrier coating spallation detection system of claim 8, wherein the thermographic based phosphor layer comprises a rare earth element.

11. The thermal barrier coating spallation detection system of claim 10, wherein the rare earth element comprises neodymium (Nd), chromium (Cr), erbium (Er), ytterbium (Yb), cerium (Ce), dysprosium (Dy), or thulium (Tm).

12. The thermal barrier coating spallation detection system of claim 1, wherein the thermal barrier coating comprises a zirconia.

13. The thermal barrier coating spallation detection system of claim 1, wherein the hot gas path component comprises a substrate with a base coat thereon.

14. The thermal barrier coating spallation detection system of claim 13, wherein the phosphor layer is positioned between the thermal barrier coating and the base coat.

15. A method of inspecting a thermal barrier coating with an underlying phosphor layer of a hot gas path component for spallation, comprising:
    emitting stimulant radiation at the thermal barrier coating;
    receiving emission radiation from the thermal barrier coating;
    comparing successive received emission radiation; and
    indicating spallation of the thermal barrier coating if a change is shown in the successive received emission radiation caused by fluorescence of the phosphor layer.

16. A thermal barrier coating spallation detection system for a gas turbine engine, comprising:
    a hot gas path component installed within the gas turbine;
    the hot gas path component comprising a phosphor layer and a thermal barrier coating applied over the phosphor layer;
    a stimulant radiation source;
    an optical device;
    wherein the optical device directs stimulant radiation at the thermal barrier coating and receives emission radiation; and
    a digital camera in communication with the optical device;
    wherein a change in the received emission radiation displayed on the digital camera caused by fluorescence of the phosphor layer indicates spallation of the thermal barrier coating.

17. The thermal barrier coating spallation detection system of claim 16, wherein the stimulant radiation source comprises a laser.

18. The thermal barrier coating spallation detection system of claim 16, wherein the digital camera comprises a pixel grid and wherein a change in the pixel grid indicates spallation of the thermal barrier coating.

19. The thermal barrier coating spallation detection system of claim 16, wherein the phosphor layer comprises a thermographic based phosphor layer.

20. The thermal barrier coating spallation detection system of claim 16, wherein the hot gas path component comprises a base coat and wherein the phosphor layer is positioned between the thermal barrier coating and the base coat.

* * * * *